United States Patent
Ochida et al.

(10) Patent No.: US 10,759,333 B2
(45) Date of Patent: Sep. 1, 2020

(54) VEHICLE CONTROL DEVICE

(71) Applicant: HONDA MOTOR CO., LTD., Minato-Ku, Tokyo (JP)

(72) Inventors: Jun Ochida, Wako (JP); Tadahiko Kanou, Wako (JP); Takuyuki Mukai, Wako (JP); Kanta Tsuji, Wako (JP); Takashi Tsujioka, Wako (JP); Jun Ibuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/478,201

(22) PCT Filed: Jan. 18, 2017

(86) PCT No.: PCT/JP2017/001455
§ 371 (c)(1),
(2) Date: Jul. 16, 2019

(87) PCT Pub. No.: WO2018/134901
PCT Pub. Date: Jul. 26, 2018

(65) Prior Publication Data
US 2019/0366914 A1   Dec. 5, 2019

(51) Int. Cl.
*B60Q 1/44* (2006.01)
*B60Q 1/34* (2006.01)
(Continued)

(52) U.S. Cl.
CPC .............. *B60Q 1/44* (2013.01); *B60Q 1/346* (2013.01); *B60W 50/02* (2013.01); *B60Q 1/46* (2013.01)

(58) Field of Classification Search
CPC ............ B60Q 1/44; B60Q 1/346; B60Q 1/46; B60W 50/02
(Continued)

(56) References Cited

U.S. PATENT DOCUMENTS 3,710,183 A * 1/1973 Kawashima ............. B60Q 1/38
315/209 R
5,696,484 A * 12/1997 Kim ..................... B60Q 1/2692
340/471
(Continued)

FOREIGN PATENT DOCUMENTS

JP   S63-111343 U   7/1988
JP   H07-021439 U   4/1995
(Continued)

OTHER PUBLICATIONS

PCT/ISA/210 from International Application PCT/JP2017/001455 with the English translation thereof.
(Continued)

*Primary Examiner* — Ojiako K Nwugo
(74) *Attorney, Agent, or Firm* — Carrier Blackman & Associates, P.C.; Joseph P. Carrier; William D. Blackman

(57) ABSTRACT

A vehicle control device of the present invention at least partially automatically performs drive control for a vehicle by self-drive and is provided with: a hazard lamp for notification around the vehicle; and a light emitting control unit which, when a predetermined condition is satisfied during self-drive, performs light emitting control causing the hazard lamp to emit light. The light emitting control unit, as well as causing the hazard lamp to emit light, performs light emitting control whereby a lighting member, different from the hazard, for notification around the vehicle is caused to emit light when the hazard lamp is not normal.

3 Claims, 5 Drawing Sheets

(51) Int. Cl.
*B60W 50/02* (2012.01)
*B60Q 1/46* (2006.01)

(58) Field of Classification Search
USPC .......................................................... 340/468
See application file for complete search history.

(56) References Cited

U.S. PATENT DOCUMENTS

| | | | | |
|---|---|---|---|---|
| 9,187,030 B1* | 11/2015 | Vaughn | ................ | B60Q 1/0076 |
| 10,185,327 B1* | 1/2019 | Konrardy | ............... | B60R 25/252 |
| 2004/0145496 A1* | 7/2004 | Ellis | .................... | G01S 13/931 |
| | | | | 340/905 |
| 2006/0028814 A1* | 2/2006 | Smith | ................. | B60Q 1/2607 |
| | | | | 362/227 |
| 2007/0080645 A1* | 4/2007 | Smith | .................... | F21V 29/70 |
| | | | | 315/83 |
| 2009/0278674 A1* | 11/2009 | Gross | ....................... | B60Q 1/26 |
| | | | | 340/452 |
| 2010/0066562 A1* | 3/2010 | Stahlin | .................. | G08G 1/162 |
| | | | | 340/902 |
| 2012/0001547 A1* | 1/2012 | Nishitani | ............ | B60Q 11/005 |
| | | | | 315/82 |
| 2014/0132405 A1* | 5/2014 | Kiefer | .................. | B60W 50/14 |
| | | | | 340/438 |
| 2015/0065060 A1* | 3/2015 | Stahlin | ................. | B60Q 1/0017 |
| | | | | 455/73 |
| 2015/0161894 A1* | 6/2015 | Duncan | .................. | G08G 1/163 |
| | | | | 701/1 |
| 2015/0251598 A1* | 9/2015 | Andrews | .................. | B60Q 7/00 |
| | | | | 362/486 |
| 2016/0167572 A1* | 6/2016 | Kim | ...................... | B60Q 1/2692 |
| | | | | 340/471 |
| 2017/0120887 A1* | 5/2017 | Kurahashi | ................ | B60Q 1/46 |
| 2017/0174127 A1* | 6/2017 | Ramdass | .............. | B60Q 1/0041 |
| 2017/0261980 A1* | 9/2017 | Matsushita | ........... | B60W 40/09 |
| 2018/0061230 A1* | 3/2018 | Madigan | ............... | B60W 50/14 |
| 2018/0173237 A1* | 6/2018 | Reiley | ................. | G05D 1/0214 |

FOREIGN PATENT DOCUMENTS

| | | |
|---|---|---|
| JP | 11-048860 A | 2/1999 |
| JP | 2015-162005 A | 9/2015 |
| JP | 2016-088334 A | 5/2016 |
| JP | 2016-168919 A | 9/2016 |

OTHER PUBLICATIONS

Office Action dated Feb. 4, 2020 issued over the corresponding Japanese national phase Patent Application No. 2018-562773 with the English translation thereof.

* cited by examiner

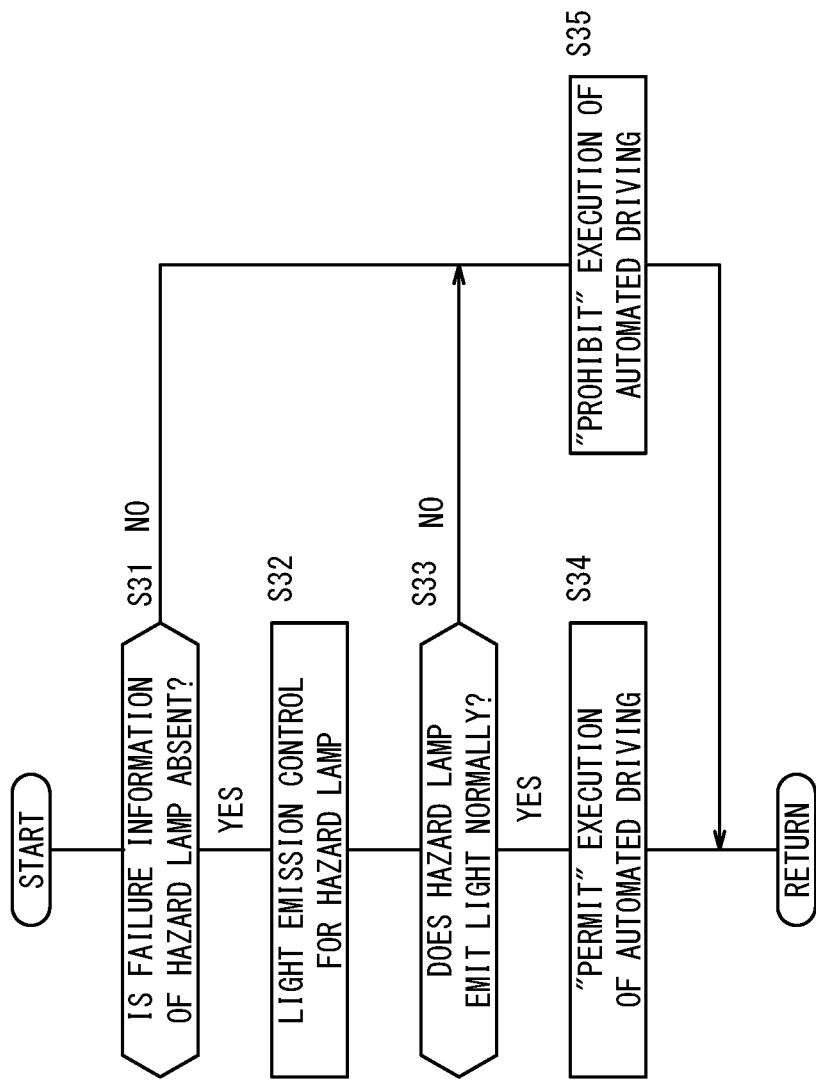

VEHICLE CONTROL DEVICE

TECHNICAL FIELD

The present invention relates to a vehicle control device that at least partially automatically performs travel control of a vehicle by automated driving.

BACKGROUND ART

A vehicle control device that at least partially automatically performs travel control of a vehicle by automated driving has conventionally been known. For example, various techniques for handling a case where the vehicle is close to a traffic jam have been developed.

Japanese Laid-Open Patent Publication No. 2016-168919 (paragraph [0009], FIG. 1) suggests a device that detects a front state where the vehicle is approaching the traffic jam. Then, if the automated driving is selected, the device lights a hazard lamp and decelerates or stops the vehicle automatically. By lighting the hazard lamp, notification of the traffic jam can be provided to the surrounding of the vehicle (especially, behind the vehicle).

SUMMARY OF INVENTION

However, in Japanese Laid-Open Patent Publication No. 2016-168919, it is assumed that the hazard lamp is normal and a situation where a lamp body including the hazard lamp does not operate normally is not considered. Especially, during the automated driving, a driver may be unaware of an operation state of the hazard lamp. Thus, it is preferable to design a system that provides notification to the surrounding of the vehicle for certain.

The present invention has been made in order to solve the above problem, and an object is to provide a vehicle control device that can provide notification to the surrounding of a vehicle for certain in automated driving.

A vehicle control device according to a first aspect of the present invention is a device configured to at least partially automatically perform travel control of a vehicle by automated driving, and the vehicle control device includes: a hazard lamp configured to provide notification to surrounding of the vehicle; and a light emission control unit configured to perform light emission control to cause the hazard lamp to emit light when a predetermined condition is satisfied during the automated driving, wherein the light emission control unit is configured to perform the light emission control to cause the hazard lamp to emit the light, and if the hazard lamp is not normal, cause a lamp body other than the hazard lamp to emit light in order to provide notification to the surrounding of the vehicle.

As described above, if the predetermined condition is satisfied during the automated driving and the hazard lamp is not normal, another lamp body emits the light. Thus, the notification function is made redundant. Therefore, notification can be provided to the surrounding of the vehicle for certain during the automated driving regardless of whether the hazard lamp is normally operated.

Moreover, if a takeover to manual driving has not been performed since the vehicle in the automated driving started a fallback operation, the light emission control unit may be configured to perform the light emission control by assuming that the predetermined condition is satisfied.

Furthermore, the lamp body may be at least one of a headlamp, a tail lamp, a position lamp, a high mount stop lamp, a rear fog lamp, a license lamp, a room lamp, and a pilot lamp.

A vehicle control device according to a second aspect of the present invention is a device configured to at least partially automatically perform travel control of a vehicle by automated driving, and the vehicle control device includes: a light emission unit configured to provide notification to surrounding of the vehicle by light emission; an operation state detection unit configured to detect an operation state of the light emission unit; and an automated driving permission/prohibition decision unit configured to permit execution of the automated driving when the operation state detection unit acquires a detection result expressing that the light emission unit operates normally, and prohibit the execution of the automated driving when the operation state detection unit acquires a detection result expressing that the light emission unit does not operate normally.

As described above, if the detection result expressing that the light emission unit does not operate normally is acquired, the execution of the automated driving is prohibited. Thus, an interlock function of the device is executed. Therefore, in the state where the light emission unit operates normally, the notification can be provided to the surrounding of the vehicle for certain during the automated driving.

By the vehicle control device according to the present invention, the notification can be provided to the surrounding of the vehicle for certain during the automated driving.

BRIEF DESCRIPTION OF DRAWINGS

FIG. 5 is a flowchart for describing an operation of the vehicle control device illustrated in FIG. 4.

DESCRIPTION OF EMBODIMENTS

Preferred embodiments of a vehicle control device according to the present invention is hereinafter described with reference to the attached drawings.

First Embodiment

First, a vehicle control device 10 according to a first embodiment of the present invention is described with reference to FIG. 1 to FIG. 3.

<Overall Configuration of Vehicle Control Device 10>

Figure 1:
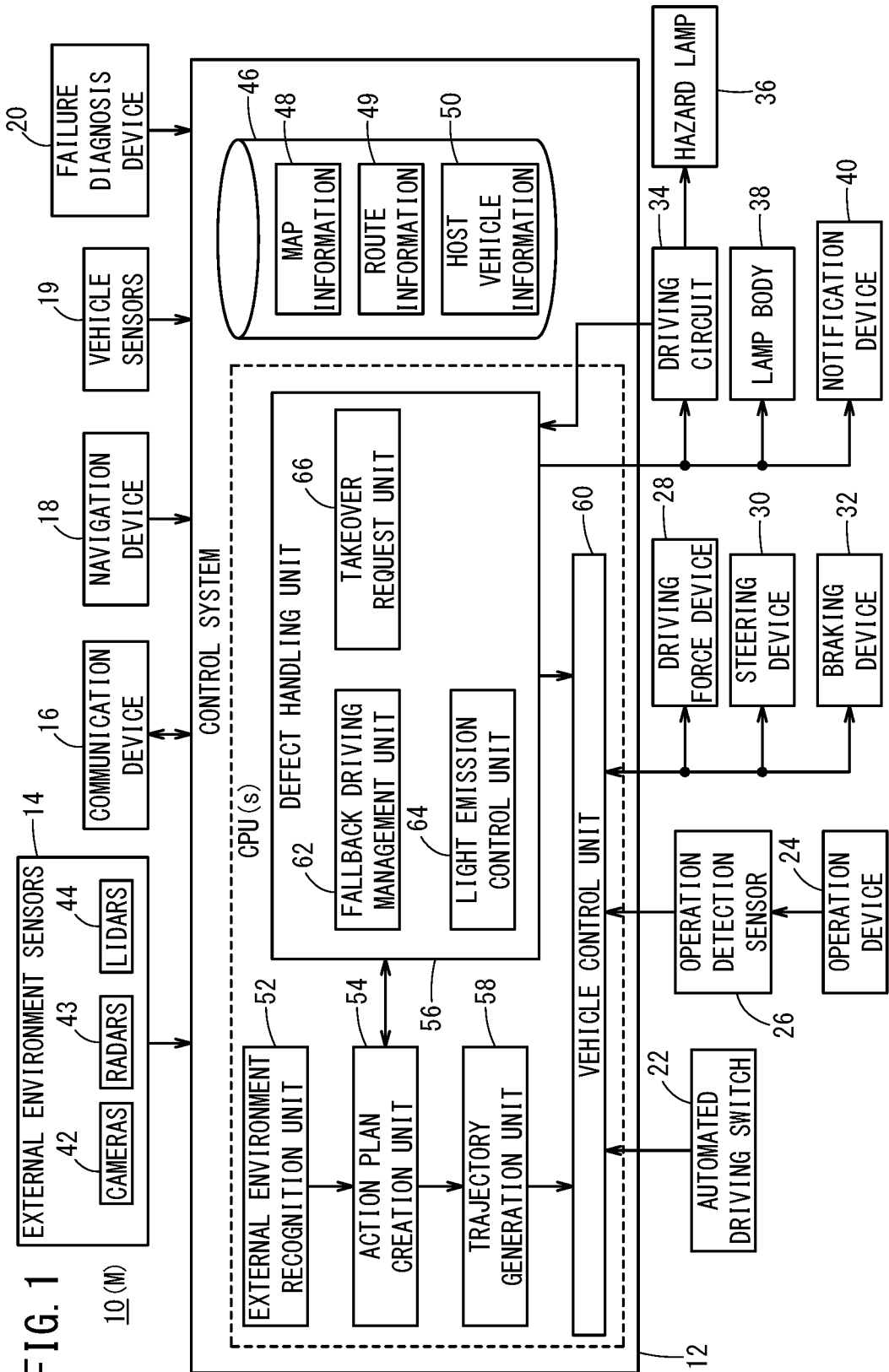
FIG. 1 is a block diagram illustrating a configuration of a vehicle control device according to a first embodiment.

FIG. 1 is a block diagram illustrating a configuration of the vehicle control device 10 according to the first embodiment. The vehicle control device 10 is incorporated in a vehicle M, and performs travel control of the vehicle M by automated driving or manual driving. This "automated driving" refers to a concept including not just "fully automated driving" in which the travel control of the vehicle M is fully automated but also "partial automated driving" in which the travel control is partially automated.

The vehicle control device 10 basically includes an input system device group, a control system 12, and an output system device group. Devices in the input system device group and the output system device group are connected to the control system 12 through communication lines.

The input system device group includes external environment sensors 14, a communication device 16, a navigation device 18, a vehicle sensor 19, a failure diagnosis device 20, an automated driving switch 22, and an operation detection sensor 26 connected to an operation device 24.

The output system device group includes a driving force device 28 that drives non-illustrated wheels, a steering device 30 that steers the wheels, a braking device 32 that brakes the wheels, a hazard lamp 36 that provides notification to the surrounding of the vehicle M, a lamp body 38 that is different from the hazard lamp 36, and a notification device 40 that notifies a driver.

<Specific Configuration of Input System Device Group>

The external environment sensors 14 acquire information expressing an external environment state of the vehicle M (hereinafter, external environment information), and outputs the external environment information to the control system 12. The external environment sensors 14 specifically include a plurality of cameras 42, a plurality of radars 43, and a plurality of LIDARs 44 (Light Detection and Ranging, Laser Imaging Detection and Ranging).

The communication device 16 is configured to be able to communicate with external devices including a road side machine, another vehicle, and a server. For example, the communication device 16 transmits and receives information regarding traffic equipment, information regarding other vehicles, probe information, or map information 48 that is the latest. This map information 48 is stored in a predetermined memory area in a storage device 46 or in the navigation device 18.

The navigation device 18 includes a satellite positioning device that can detect the current position of the vehicle M, and a user interface (for example, a touch panel display, a speaker, and a microphone). The navigation device 18 calculates a route to a designated destination on the basis of the current position of the vehicle M or the position designated by the user, and outputs the route to the control system 12. The route calculated by the navigation device 18 is stored as route information 49 in the predetermined memory area in the storage device 46.

The vehicle sensors 19 include a speed sensor that detects a travel speed of the vehicle M (vehicle speed), an acceleration sensor that detects acceleration, a lateral acceleration sensor that detects lateral acceleration, a yaw rate sensor that detects an angular speed around a vertical axis, an azimuth sensor that detects a direction/azimuth, and an inclination sensor that detects inclination. The vehicle sensors 19 output detection signals from these sensors to the control system 12. These detection signals are stored as host vehicle information 50 in the predetermined memory area in the storage device 46.

The failure diagnosis device 20 is a device for diagnosing an operation state of an ECU (Electronic Control Unit) or a vehicle part (hereinafter, also referred to as "component" collectively), for example, whether the component fails or an electric wiring is broken. In the example in this drawing, the failure diagnosis device 20 is mounted on the vehicle M (OBD; On-Board Diagnostics), but the failure diagnosis device 20 may alternatively be connected to the vehicle M from the outside of the vehicle M through the communication device 16.

The automated driving switch 22 is, for example, a push button switch provided on an instrument panel. The automated driving switch 22 is configured to be able to change a plurality of driving modes with different automated driving degrees through a manual operation of the user including the driver.

The operation device 24 includes an accelerator pedal, a steering wheel, a brake pedal, a shift lever, and a direction indicating lever. To the operation device 24, the operation detection sensor 26 is attached. The operation detection sensor 26 detects whether a driver's operation is performed, the operation amount, or an operation position.

The operation detection sensor 26 outputs the detection result to a vehicle control unit 60. The detection result is, for example, the accelerator stepping amount (accelerator opening), the steering operation amount (steering amount), the brake stepping amount, a shift position, a right/left turning direction, or the like.

<Specific Configuration of Output System Device Group>

The driving force device 28 includes a driving force ECU and a driving source including an engine or a traction motor. The driving force device 28 generates travel driving force (torque) for the vehicle in accordance with a vehicle control value that is input by the vehicle control unit 60, and transmits the travel driving force to the wheels directly or through a transmission.

The steering device 30 includes an EPS (electric power steering system) ECU and an EPS device. The steering device 30 changes the direction of the wheels (steering wheels) in accordance with the vehicle control value that is input by the vehicle control unit 60.

The braking device 32 is, for example, an electric servo brake that is used in combination with a hydraulic brake, and includes a brake ECU and a brake actuator. The braking device 32 brakes the wheels in accordance with the vehicle control value that is input by the vehicle control unit 60.

A driving circuit 34 is an electric circuit that causes the hazard lamp 36 to emit light by supplying desired driving current, and includes a state sensor that detects a light emission state of the hazard lamp 36. This state sensor may be a current sensor that detects the amount of current that passes the hazard lamp 36, or a light sensor that detects the amount of light emission from the hazard lamp 36.

For example, the hazard lamp 36 includes four direction indicators provided to the front, rear, left, and right of a vehicle body, and is an emergency blinking display lamp that is used in an emergency or when the vehicle M stops. The lamp body 38 is provided to various positions of the vehicle M. The lamp body 38 is a lamp that is different from the hazard lamp 36. Each of the hazard lamp 36 and the lamp body 38 is provided at a position where the light emission state can be seen from the outside of the vehicle M. Both of them function as a light emission unit so that the notification can be provided to the surrounding of the vehicle M.

The lamp body 38 is at least one of various lamps normally mounted on the vehicle M, for example, a headlamp, a tail lamp, a position lamp, a high mount stop lamp, a rear fog lamp, a license lamp, and a room lamp. Alternatively, the lamp body 38 may be a lamp peculiarly mounted on an automated driving vehicle, for example, a pilot lamp to provide notification of a state of the automated driving.

The notification device 40 includes a notification ECU, a display device, and an audio device. The notification device 40 performs a notification operation (including TOR to be described below) regarding the automated driving or the manual driving in accordance with a notification instruction that is output from the control system 12 (specifically, a defect handling unit 56).

<Driving Mode>

Here, "the automated driving mode" and "the manual driving mode" (non-automated driving mode) are switched every time the automated driving switch 22 is pushed. Alternatively, to surely confirm the driver's intention, for example, the manual driving mode can be switched to the automated driving mode when the automated driving switch 22 is pushed twice, and the automated driving mode can be switched to the manual driving mode when the automated driving switch 22 is pushed once.

The automated driving mode is a driving mode in which the vehicle M travels under control by the control system 12 in a state where the driver does not operate the operation device 24 (specifically, an accelerator pedal, a steering wheel, or a brake pedal). In other words, the automated driving mode is a driving mode in which the control system 12 controls the driving force device 28, the steering device 30, and the braking device 32 partially or entirely in accordance with an action plan that is created successively.

If the driver performs a predetermined operation with the operation device 24 during the automated driving mode, the automated driving mode is canceled automatically and switched to the driving mode with a relatively low degree of the automated driving (including manual driving mode). The driver's operation of the automated driving switch 22 or the operation device 24 for the transition from the automated driving to the manual driving is hereinafter also referred to as an "override operation".

<Configuration of Control System 12>

The control system 12 is configured by one or a plurality of ECUs, and includes various function achievement units in addition to the storage device 46 described above. In this embodiment, the function achievement unit is a software function unit that achieves a function when one or a plurality of CPUs (central processing units) executes programs stored in the storage device 46 that is non-transitory. The function achievement unit may alternatively be a hardware function unit including an integrated circuit such as an FPGA (Field-Programmable Gate Array).

The control system 12 includes, in addition to the storage device 46 and the vehicle control unit 60, an external environment recognition unit 52, an action plan creation unit 54, the defect handling unit 56, and a trajectory generation unit 58.

The external environment recognition unit 52 recognizes lane marks (white lines) on both sides of the vehicle M with reference to various pieces of information input from the input system device group (such as external environment information from the external environment sensors 14), and generates "static" external environment recognition information including positional information about a stop line and a traffic signal or a travel possible area. In addition, the external environment recognition unit 52 generates "dynamic" external environment recognition information including an obstacle such as a parked or stopped vehicle, a traffic participant such as a person or another vehicle, or the color of the traffic signal with reference to various pieces of information that are input.

The action plan creation unit 54 creates an action plan (events in a time series) for each travel section on the basis of the recognition result from the external environment recognition unit 52, and updates the action plan as necessary. Examples of the kind of events include decelerating, accelerating, branching, merging, lane keeping, lane changing, and overtaking. Here, "decelerating" and "accelerating" are the events of decelerating and accelerating the vehicle M, respectively. "Branching" and "merging" are the events of making the vehicle M smoothly travel at a branch point and a merge point, respectively. "Lane changing" is the event of making the vehicle M change the travel lane. "Overtaking" is the event of making the vehicle M overtake a preceding vehicle.

"Lane keeping" is the event of making the vehicle M travel so as not to depart from the travel lane, and is subdivided depending on the combination with a travel mode. Specific examples of the travel mode include constant-speed traveling, follow-on traveling, traveling while decelerating, traveling through a curve, and traveling to avoid obstacles.

The defect handling unit 56 performs a defect handling process for each component, and outputs a signal to the action plan creation unit 54, the vehicle control unit 60, the driving circuit 34, the lamp body 38, or the notification device 40. Specifically, the defect handling unit 56 functions as a fallback management unit 62, a light emission control unit 64, and a takeover request unit 66.

The trajectory generation unit 58 generates a travel trajectory (target behaviors in a time series) that follows the action plan created by the action plan creation unit 54 by using the map information 48, the route information 49, and the host vehicle information 50 read out from the storage device 46. This travel trajectory is a time-series data set whose data units each include a position, a posture angle, a speed, an acceleration, a curvature, a yaw rate, and a steering angle.

The vehicle control unit 60 decides various vehicle control values for controlling the travel of the vehicle M in accordance with the travel trajectory (target behaviors in a time series) generated by the trajectory generation unit 58. The vehicle control unit 60 outputs the obtained vehicle control values to the driving force device 28, the steering device 30, and the braking device 32.

<Operation of Vehicle Control Device 10>

The vehicle control device 10 according to the first embodiment is configured as above. Next, an operation of the vehicle control device 10 regarding the fallback of the vehicle M is described mainly with reference to a flowchart in FIG. 2. Here, it is assumed that the vehicle M including the vehicle control device 10 travels in the lane by the automated driving or the manual driving.

In step S1, the control system 12 determines whether the automated driving mode is "ON". If the automated driving mode is not "ON" (is "OFF") (step S1: NO), the process remains in step S1 until the automated driving mode becomes "ON". On the other hand, if it is determined that the automated driving mode is "ON" (step S1: YES), the process advances to the next step (S2).

In step S2, the control system 12 (more specifically, the defect handling unit 56) acquires diagnosis information from the failure diagnosis device 20, and determines whether the component has failed. If it is determined that the component has not failed (step S2: NO), the process returns to step S1 and, subsequently, the process in steps S1 and S2 is successively repeated. On the other hand, if it is determined that the component has failed (step S2: YES), the process advances to the next step (S3).

In step S3, the fallback management unit 62 starts a fallback operation in accordance with a failure situation of the component. Here, the "fallback operation" means continuation in operation in a state where a function or performance regarding the automated driving is partially stopped. For example, it is a driving state where acceleration operation for the vehicle M by the driving force device 28 is forbidden.

In step S4, the light emission control unit 64 performs light emission control for at least the hazard lamp 36 so as to provide notification to the surrounding of the vehicle M, notifying that the fallback operation has been started in step S3. This light emission control will be described below in detail.

In step S5, the takeover request unit 66 performs a request operation for requesting the driver to perform the takeover to the manual driving. Then, the notification device 40 notifies the driver to perform the takeover in accordance with the request operation (notification instruction) from the takeover request unit 66. A series of these operations from the request operation to the notification operation may hereinafter be referred to as a "TOR" (take-over request).

In step S6, the control system 12 (for example, the vehicle control unit 60) determines whether the override operation by the driver has been received. If the override operation has not been received yet (step S6: NO), the process advances to the next step (S7).

In step S7, the takeover request unit 66 determines whether a predetermined time has passed from a TOR start point. If the predetermined time has not passed yet (step S7: NO), the process returns to step S5 and the process in steps S5 to S7 is successively repeated. In step S6, if the override operation has been received (step S6: YES), the process advances to step S8.

In step S8, the fallback management unit 62 makes a transition from the automated driving including the fallback operation to the manual driving. After that, the vehicle control device 10 continues the manual travel control of the vehicle M.

On the other hand, back to step S7, if the predetermined time has passed from the TOR start point (step S7: YES), the process advances to step S9.

In step S9, the vehicle control unit 60 starts stop control to cause the traveling vehicle M to move to a road shoulder and stops. Before this control, the defect handling unit 56 notifies the action plan creation unit 54 that the vehicle M will be stopped at the road shoulder. Along with the change in the action plan, the trajectory generation unit 58 generates the travel trajectory to steer the vehicle M toward the road shoulder and stop the vehicle M. Thus, the vehicle M travels in accordance with the travel trajectory that is generated by the trajectory generation unit 58.

In step S10, the light emission control unit 64 performs the light emission control for at least the hazard lamp 36 so as to provide notification to the surrounding of the vehicle M, notifying that the stop control has been started in step S9. This light emission control will be described below in detail.

In step S11, the vehicle control unit 60 determines whether the override operation by the driver has been received. If the override operation has not been received yet (step S11: NO), the process returns to step S10 and the light emission control (step S10) is continued.

On the other hand, if the override operation has been received (step S11: YES), the vehicle control unit 60 makes a transition from the automated driving in which the stop control is being performed, to the manual driving (step S8). After that, the vehicle control device 10 continues the manual travel control of the vehicle M.

As described above, the vehicle control device 10 ends the operation regarding the fallback of the vehicle M. Note that in this flowchart, the fallback operation is started using a "component failure" (see step S2) as a trigger, but a start condition is not limited thereto. For example this start condition may be the occurrence of a state where a function of the component has been lost temporarily due to the change in a travel environment (that is, functional defect), or the occurrence of a state where it is difficult to continue the automated travel control due to the change in the travel environment (that is, performance limit).

<Operation Example by Light Emission Control>

Subsequently, the light emission control by the light emission control unit 64 (steps S4, S10 in FIG. 2) is described in detail with reference to a flowchart in FIG. 3.

As described above, the light emission control unit 64 performs the light emission control if a predetermined condition is satisfied during the automated driving. This predetermined condition is [1] the fallback operation is started (step S3) or [2] the predetermined time has passed from the TOR start time without the takeover to the manual driving (step S7). However, the predetermined condition may alternatively be an optional condition expressing a situation where it is desirable to provide notification to the surrounding of the vehicle M, for example, in the emergency or when the vehicle M stops.

In step S21, the light emission control unit 64 determines whether failure information of the hazard lamp 36 is absent in the diagnosis information from the failure diagnosis device 20. If the failure information is absent (step S21: YES), the process advances to step S22.

In step S22, the light emission control unit 64 performs the light emission control to cause the hazard lamp 36 to emit the light. Specifically, the light emission control unit 64 outputs to the driving circuit 34, a light emission instruction for the hazard lamp 36. Thus, if the hazard lamp 36 is normal (normally operated), the hazard lamp 36 emits the light (lighting or blinking) at a desired timing in accordance with the driving current that is supplied from the driving circuit 34.

In step S23, the light emission control unit 64 determines whether the hazard lamp 36 emits the light normally on the basis a detection value that is output from the driving circuit 34. If the hazard lamp 36 emits the light normally (step S23: YES), the light emission control in steps S4, S10 ends. In this case, since the hazard lamp 36 operates normally, it is possible to provide notification to the surrounding of the vehicle M.

On the other hand, if it is determined that the failure information of the hazard lamp 36 is not absent (the failure information of the hazard lamp 36 is included, step S21: NO) or if it is determined that the hazard lamp 36 does not emit the light normally (step S23: NO), the process advances to step S24.

In step S24, the light emission control unit 64 selects one or the plurality of lamp bodies 38 (hereinafter, also referred to as an alternative lamp body or alternative lamp bodies) that emit the light instead of the hazard lamp 36. Here, the light emission control unit 64 may statically select the lamp body 38 in accordance with a rule determined in advance, or dynamically select the lamp body 38 in accordance with the situation.

In step S25, the light emission control unit 64 performs the light emission control to cause the alternative lamp body selected in step S24 to emit the light. Thus, the alternative lamp body emits the light (lighting or blinking) at a desired timing in accordance with the control of the light emission control unit 64. By performing the light emission control for the hazard lamp 36 and the alternative lamp body concurrently, it is possible to provide notification to the surrounding of the vehicle M by using the alternative lamp body (lamp body 38) even if the hazard lamp 36 does not operate normally.

<Specific Example>

As described above, the light emission control unit 64 performs the light emission control for the hazard lamp 36 or the lamp body 38 (alternative lamp body). Subsequently, a specific example for enhancing the visibility or the durability of the light emission is described.

(1. Method for Selecting Lamp Body 38)

A method for selecting the lamp body 38 may be varied in accordance with, for example, a vehicle type, a type/positional relation of the lamp body 38, a state of the fallback operation (level of failure), or the travel environment (surrounding environment, weather, region, or time zone).

From the viewpoint of a disposed position, [1] the lamp body 38 in the rear, side, and front may be selected in this order of priority. From the viewpoint of the visibility, [2] the lamp body 38 with a large irradiation area or [3] the lamp body 38 whose color expresses emergency or abnormality (for example, red) may be selected with high priority.

In addition, if the plurality of lamp bodies 38 is selected, [4] the plurality of lamp bodies 38 that are close to each other, [5] the plurality of lamp bodies 38 with similar color saturation or hue, or [6] the plurality of lamp bodies 38 with similar brightness may be selected with high priority. From the above viewpoints, preferable examples include a high mount stop lamp or a brake lamp in a rear combination lamp.

(2. Method for Controlling Lamp Body 38)

A control parameter regarding the light emission control may be varied in accordance with, for example, the vehicle type, the type/positional relation of the lamp body 38, the state of the fallback operation (level of failure), or the travel environment (surrounding environment, weather, region, or time zone). This control parameter includes, for example, light emission brightness, a light duty ratio, a blinking period, or control time (start time point, end time point, and execution time).

In general, [1] as the light emission brightness is higher, [2] as the light duty ratio is closer to 50%, [3] as the blinking period is shorter, or [4] as the execution time is longer, the visibility becomes relatively higher in a display mode. Moreover, if the plurality of lamp bodies 38 emit the light concurrently, the visibility of the light emission becomes higher when [5] the lamp bodies 38 have the same or varied blinking periods, or [6] the lamp bodies 38 have the same or varied light emission hues.

(3. Light Emission Control in Decelerating/Stopping)

The light emission control unit 64 may perform the light emission control to cause the brake lamp selected as the alternative lamp body to emit the light (for example, lighting) while the vehicle M decelerates. Especially, by blinking the brake lamp in a case where the deceleration is higher than a threshold, a driver in the following vehicle can be strongly warned.

Moreover, the light emission control unit 64 may perform the light emission control to light the plurality of lamp bodies 38 selected as the alternative lamp body concurrently while the vehicle M stops. Especially, by concurrently lighting all the lamp bodies 38 that can be selected, the notification of the existence and the position of the vehicle M can be provided in a wide area.

(4. Light Emission Control in Accordance with Surrounding Environment)

In a surrounding environment where the driver's visibility is relatively low, the light emission control unit 64 may perform the light emission control by allowing more light bodies 38 to be selected and/or in a more visually emphasized mode than in a surrounding environment where the visibility is relatively high.

For example, while the vehicle M is traveling in a tunnel, the light emission control unit 64 may perform the light emission control to cause the lamp body 38 with red color to emit the light in order to suppress the influence of an additive color mixture with illumination in the tunnel (light emission color of low-pressure sodium lamp). Moreover, when it is foggy around the vehicle M, the light emission control unit 64 may perform the light emission control to cause the rear fog lamp selected as the alternative lamp to emit the light in order to provide notification to the following vehicle for certain.

In addition, when it is dark around the vehicle M, the light emission control unit 64 may cause the plurality of lamp bodies 38 to blink concurrently by the same blinking period or light emission phase. Thus, the difference between the brightness and the darkness can be increased, so that the visibility of the light emission becomes higher.

(5. Light Emission Control in Accordance with Failure Degree)

The light emission control unit 64 may perform the light emission control that is varied in accordance with a failure degree in the component. For example, the light emission control may vary in accordance with a combination between the operation states of a battery and a power generator included in the vehicle M. For example, if both the battery and the power generator are normal, the light emission control unit 64 can perform the light emission control (that is normal) determined in advance without a limitation regarding power supply and demand.

On the other hand, if only the battery is normal, the light emission control unit 64 may select the lamp body 38 whose power consumption is relatively small in consideration of the residual amount of the battery, and cause the selected lamp body 38 to emit the light. Thus, the lamp body 38 can continue to emit the light for a long time.

Alternatively, if only the power generator is normal, the light emission control unit 64 may perform the light emission control with a control parameter changed in order to equalize the power consumption (to suppress peak power) in consideration of the power generation performance of the power generator. Thus, the lamp body 38 can continue to emit the light without an intermission.

<Effect of Vehicle Control Device 10>

As described above, the vehicle control device 10 is the device configured to at least partially automatically perform the travel control of the vehicle M by the automated driving, and the vehicle control device 10 includes: [1] the hazard lamp 36 configured to provide notification to the surrounding of the vehicle M; and [2] the light emission control unit 64 configured to perform the light emission control to cause the hazard lamp 36 to emit the light when the predetermined condition is satisfied during the automated driving, wherein [3] the light emission control unit 64 is configured to perform the light emission control to cause the hazard lamp 36 to emit the light and if the hazard lamp 36 is not normal, cause the lamp body 38 other than the hazard lamp 36 to emit the light in order to provide notification to the surrounding of the vehicle M.

A vehicle control method using the vehicle control device 10 includes: [1] causing one or a plurality of CPUs to execute a light emission control step (S4, S10) of performing the light emission control to cause the hazard lamp 36 to emit the light if the predetermined condition is satisfied during the automated driving; and [2] causing the hazard lamp 36 to emit the light (S22) and if the hazard lamp 36 is not normal (S21, S23: NO), causing the lamp body 38 other than the hazard lamp 36 to emit the light in order to provide notification to the surrounding of the vehicle M (S25) in the light emission control step.

As described above, if the predetermined condition is satisfied during the automated driving and the hazard lamp 36 is not normal, the lamp body 38 other than the hazard lamp 36 emits the light. Thus, the notification function is made redundant. Therefore, the notification can be provided to the surrounding of the vehicle M for certain during the automated driving regardless of whether the hazard lamp 36 is normal.

<Modifications in First Embodiment>

Figure 2:
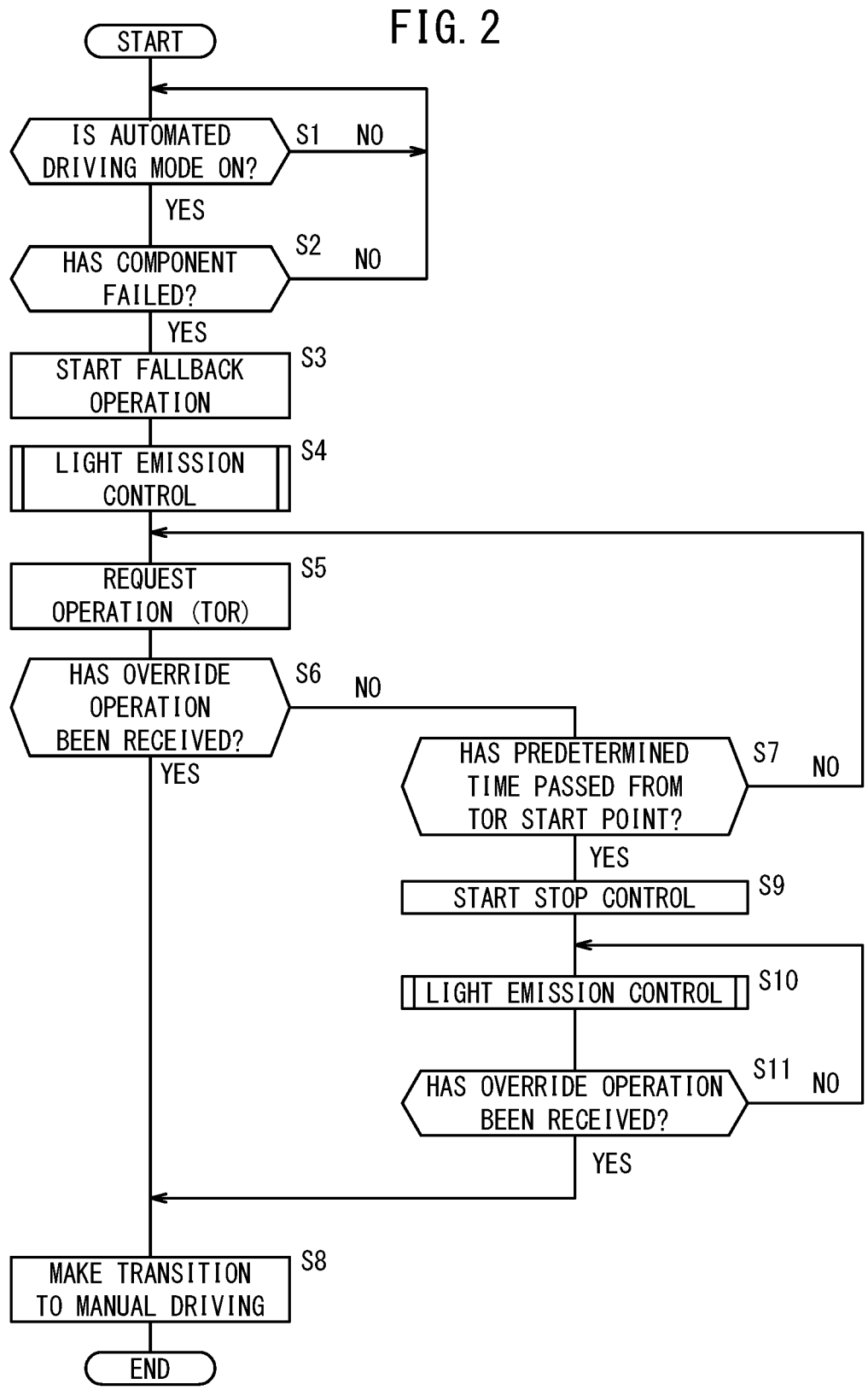
FIG. 2 is a flowchart for describing an operation of the vehicle control device illustrated in FIG. 1.
Figure 3:
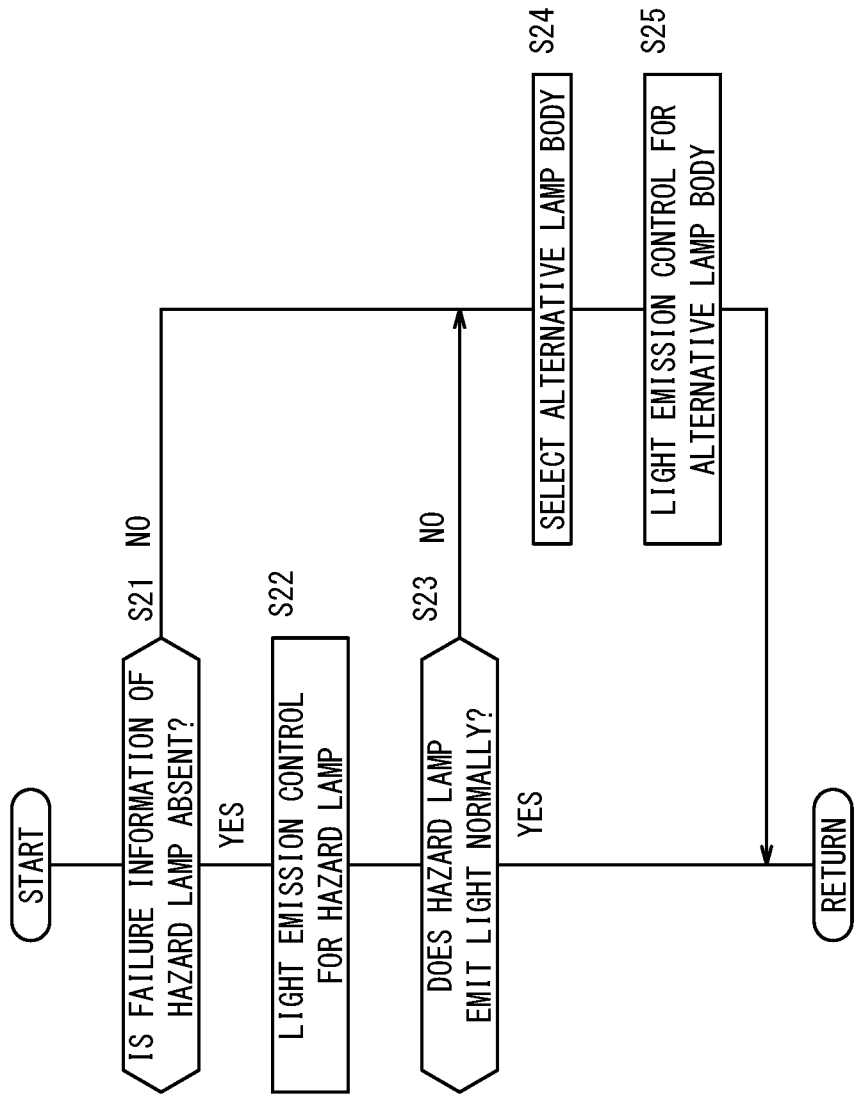
FIG. 3 is a detailed flowchart regarding light emission control in steps S4, S10 in FIG. 2.

Note that the operation of the vehicle control device 10 is not limited by the flowcharts in FIG. 2 and FIG. 3, and may employ various modifications.

In FIG. 2, if it is determined that the component fails, the fallback operation is started (step S3). However, the start condition of the fallback operation is not limited thereto. For example, the start condition may be the detection of an accident of the driver or the acquisition of disaster information regarding an earthquake, a tsunami, weather, or the like from the outside.

In FIG. 2, before the currently traveling vehicle M stops, the light emission control is performed (S10). However, the light emission control may be started after the vehicle M has stopped completely. Similarly, the end time point of the light emission control may be set arbitrarily, and the lamp body 38 may be turned off automatically, or automatically by the manual operation. The light emission control is performed in each of steps S4 and S10. However, the light emission control may be performed in only one of steps S4 and S10.

In FIG. 3, the light emission control in step S4 and the light emission control in step S10 are not distinguished. However, the light emission control in step S4 and the light emission control in step S10 may be performed in different modes. Instead of performing the determination for the state of the hazard lamp 36 twice (S21, S23), the state determination may be performed only once, for example, before the execution (S21) of the light emission control (S22), or after the execution (S23).

Second Embodiment

Subsequently, a vehicle control device 100 according to a second embodiment of the present invention is described with reference to FIG. 4 and FIG. 5. Note that a configuration that is the same as the configuration in the first embodiment (vehicle control device 10) is denoted by the same reference sign, and the description regarding the same configuration may be omitted.

<Configuration of Vehicle Control Device 100>

Figure 4:
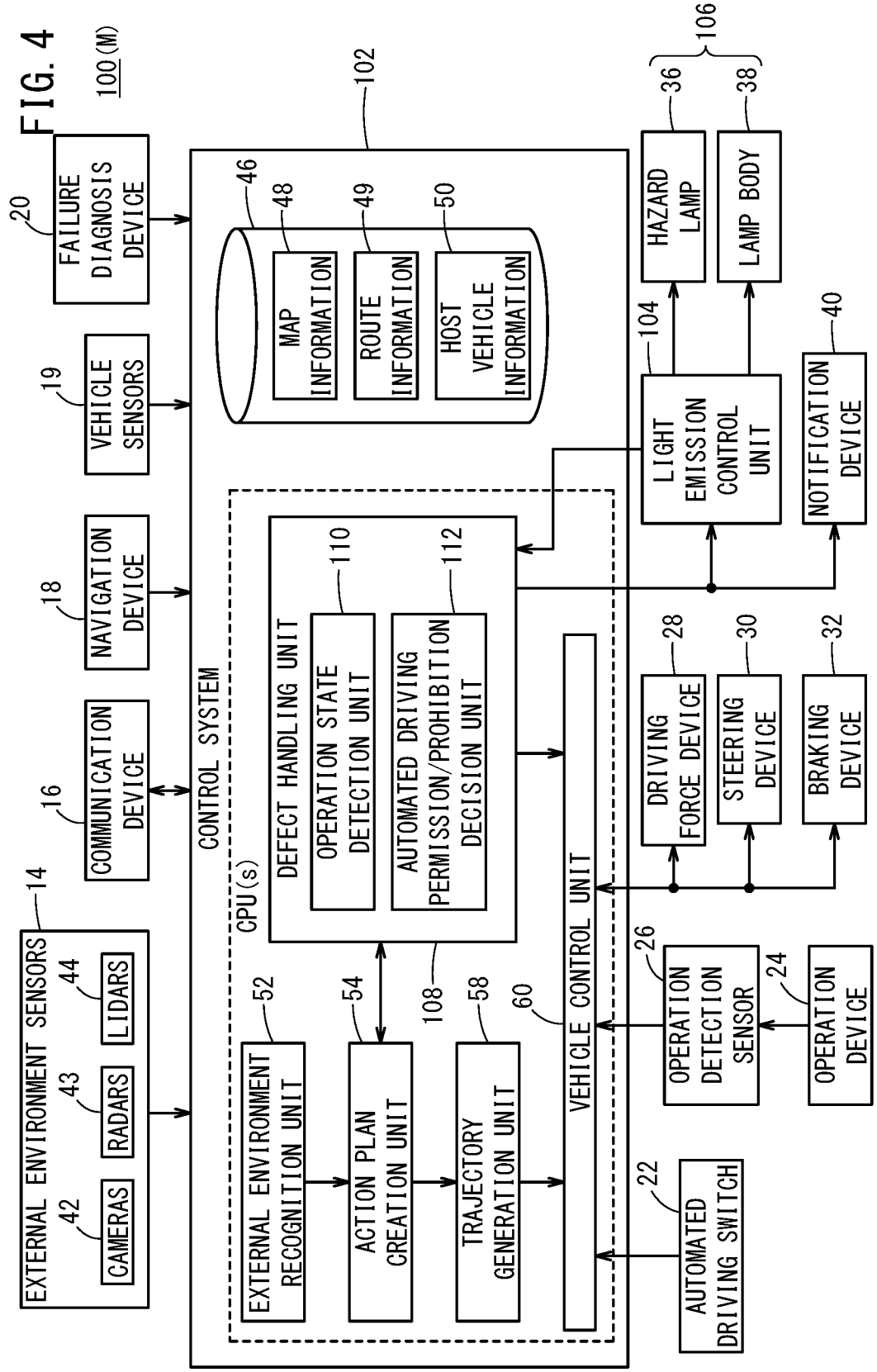
FIG. 4 is a block diagram illustrating a configuration of a vehicle control device according to a second embodiment.

FIG. 4 is a block diagram illustrating a configuration of the vehicle control device 100 according to the second embodiment. The vehicle control device 100 is incorporated in the vehicle M, and performs the travel control of the vehicle M by the automated driving or the manual driving.

The vehicle control device 100 includes the input system device group, a control system 102, and the output system device group. Devices in the input system device group and the output system device group are connected to the control system 102 through the communication lines. Here, a configuration of the input system device group is basically the same as the configuration in the first embodiment (FIG. 1), and the description of the same configuration is omitted.

The output system device group includes the driving force device 28, the steering device 30, the braking device 32, the hazard lamp 36, the lamp body 38, the notification device 40, and a light emission control unit 104. That is to say, the output system device group according to the second embodiment has a configuration that is different from the configuration according to the first embodiment (FIG. 1) in that the light emission control unit 104 is included instead of the driving circuit 34.

The light emission control unit 104 is a control unit that causes the hazard lamp 36 or the lamp body 38 (hereinafter, also referred to as a "light emission unit 106" collectively) to emit the light by supplying the desired driving current, and includes the state sensor that detects the light emission state. This state sensor may be the current sensor or the light sensor similarly to the driving circuit 34 (FIG. 1).

The control system 102 includes, in addition to the storage device 46 and the vehicle control unit 60, the external environment recognition unit 52, the action plan creation unit 54, the trajectory generation unit 58, and a defect handling unit 108. That is to say, the control system 102 according to the second embodiment has a configuration that is different from the configuration according to the first embodiment (FIG. 1) in that the defect handling unit 108 with a different process function is included.

The defect handling unit 108 performs the defect handling process for each component, and outputs the signal to the vehicle control unit 60, the light emission control unit 104, or the notification device 40. Specifically, the defect handling unit 108 functions as an operation state detection unit 110 and an automated driving permission/prohibition decision unit 112.

<Operation of Vehicle Control Device 100>

The vehicle control device 100 according to the second embodiment is configured as described above. Subsequently, an operation of the vehicle control device 100 (especially, permission/prohibition decision operation for automated driving mode) is described mainly with reference to a flowchart in FIG. 5.

In step S31, the operation state detection unit 110 determines whether the failure information of the hazard lamp 36 is absent in the diagnosis information from the failure diagnosis device 20. If the failure information is absent (step S31: YES), the process advances to step S32.

In step S32, the operation state detection unit 110 performs the light emission control to cause the hazard lamp 36 to emit the light. Specifically, the operation state detection unit 110 outputs to the light emission control unit 104, the light emission instruction for the hazard lamp 36. Thus, if the hazard lamp 36 is normal, the hazard lamp 36 emits the light (lighting or blinking) at the desired timing in accordance with the driving current that is supplied from the light emission control unit 104.

In step S33, the operation state detection unit 110 determines whether the hazard lamp 36 emits the light normally on the basis a detection value that is output from the light emission control unit 104. If a detection result expressing that the hazard lamp 36 operates normally is acquired (step S33: YES), the process advances to step S34. On the other hand, if a detection result expressing that the hazard lamp 36 does not operate normally is acquired (step S33: NO), the process advances to step S35.

In step S34, the automated driving permission/prohibition decision unit 112 decides to "permit" the execution of the automated driving. By this decision, the control system 102 makes a transition from the manual driving mode to the automated driving mode in accordance with the operation of the automated driving switch 22.

In step S35, the automated driving permission/prohibition decision unit 112 decides to "prohibit" the execution of the automated driving. By this decision, the control system 102 maintains the manual driving mode without making a transition to the automated driving mode even if the operation of the automated driving switch 22 is received.

<Effect of Vehicle Control Device 100>

As described above, the vehicle control device 100 is the device configured to at least partially automatically perform the travel control of the vehicle M by the automated driving, and the vehicle control device 100 includes: [1] the hazard lamp 36 (light emission unit) configured to provide notification to the surrounding of the vehicle M by the light emission; [2] the operation state detection unit 110 configured to detect the operation state of the hazard lamp 36; and [3] the automated driving permission/prohibition decision unit 112 configured to (3a) permit execution of the automated driving when the detection result expressing that the hazard lamp 36 operates normally is acquired, and (3b) prohibit the execution of the automated driving when the detection result expressing that the hazard lamp 36 does not operate normally is acquired.

A vehicle control method using the vehicle control device 100 includes: [1] a detection step (S31, S33) of detecting the operation state of the hazard lamp 36 (light emission unit); and [2] a decision step (S34, S35) of (2a) permitting the execution of the automated driving when the detection result expressing that the hazard lamp 36 operates normally is acquired, and (2b) prohibiting the execution of the automated driving when the detection result expressing that the hazard lamp 36 does not operate normally is acquired.

As described above, if the detection result expressing that the hazard lamp 36 does not operate normally is acquired, the execution of the automated driving is prohibited. Thus, the interlock function of the device is executed. Therefore, in the state where the hazard lamp 36 operates normally, the notification can be provided to the surrounding of the vehicle M for certain during the automated driving.

<Modifications in Second Embodiment>

Note that the operation of the vehicle control device 100 is not limited by the flowchart in FIG. 5, and may employ various modifications.

In FIG. 5, the operation state detection unit 110 detects/determines the operation state of the hazard lamp 36 (one kind of lamp body) (steps S31, S33). However, a combination of the number of or the kind of the determination targets is not limited thereto. That is to say, the determination target may be the light emission unit 106 that is provided at the position where the light emission state can be seen from the outside of the vehicle M, and that can provide notification to the surrounding of the vehicle M.

In addition, similarly to the first embodiment, instead of performing the determination for the state of the light emission unit 106 twice (S31, S33), the state determination may be performed once, for example, before the execution (S31) of the light emission control (S32), or after the execution (S33).

[Supplement]

The present invention is not limited to the embodiment described above, and can be changed freely within the range not departing from the concept of the present invention. Alternatively, the configurations can be combined arbitrarily within the range not contradicting each other technically.

The invention claimed is:

1. A vehicle control device configured to at least partially automatically perform travel control of a vehicle by automated driving, the vehicle control device comprising:
    a hazard lamp configured to provide notification to surrounding of the vehicle; and
    a light emission control unit configured to perform light emission control to cause the hazard lamp to emit light when a predetermined condition is satisfied during the automated driving,
    wherein the light emission control unit is configured to perform the light emission control to cause the hazard lamp to emit the light, and if the hazard lamp is not normal, cause a lamp body other than the hazard lamp to emit light in order to provide notification to the surrounding of the vehicle, and
    wherein if a takeover to manual driving has not been performed since the vehicle in the automated driving started a fallback operation, the light emission control unit is configured to perform the light emission control by assuming that the predetermined condition is satisfied.

2. The vehicle control device according to claim 1, wherein the lamp body is at least one of a headlamp, a tail lamp, a position lamp, a high mount stop lamp, a rear fog lamp, a license lamp, a room lamp, and a pilot lamp.

3. The vehicle control device according to claim 1, further comprising:
    a failure diagnosis unit configured to diagnose whether there is a failure in function of automatic driving of the vehicle; and
    a fallback management unit configured to continue the automated driving while partially stopping the function of the automated driving of the vehicle, when the failure diagnosis unit has diagnosed a failure.

\* \* \* \* \*